(12) United States Patent
Dannemann et al.

(10) Patent No.: US 11,131,407 B1
(45) Date of Patent: Sep. 28, 2021

(54) PRELOAD APPARATUS

(71) Applicant: National Technology & Engineering Solutions of Sandia, LLC, Albuquerque, NM (US)

(72) Inventors: William Jackson Dannemann, San Francisco, CA (US); Keir Christopher Gonyea, Dublin, CA (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 151 days.

(21) Appl. No.: 16/588,365

(22) Filed: Sep. 30, 2019

Related U.S. Application Data

(60) Provisional application No. 62/753,810, filed on Oct. 31, 2018.

(51) Int. Cl.
*F16L 15/08* (2006.01)
*F16L 15/00* (2006.01)

(52) U.S. Cl.
CPC ............. *F16L 15/08* (2013.01); *F16L 15/006* (2013.01)

(58) Field of Classification Search
CPC .................................. F16L 15/08; F16L 15/006
See application file for complete search history.

(56) References Cited

U.S. PATENT DOCUMENTS

| | | |
|---|---|---|
| 5,051,005 A | 9/1991 | Duncan |
| 6,454,010 B1 | 9/2002 | Thomas et al. |
| 8,613,558 B2 | 12/2013 | Takahashi et al. |
| 9,599,259 B2 | 3/2017 | Bailey et al. |
| 2014/0079468 A1 | 3/2014 | Jensen et al. |
| 2018/0003162 A1* | 1/2018 | Kielczykowski ......... F16F 1/12 |

* cited by examiner

*Primary Examiner* — Rick K Chang
(74) *Attorney, Agent, or Firm* — Medley, Behrens & Lewis, LLC

(57) ABSTRACT

An apparatus for providing a preload to mated pipes including a ring-shaped body formed by a sidewall and an attachment structure on a portion of the body. The ring-shaped body includes an aperture that extends through the sidewall. The attachment structure corresponds to an attachment portion of a pipe in the mated pipes and the attachment structure enables removable fastening of the body to the pipe. The apparatus may further include an adjustable preload mechanism that can be removably attached to the body to hold the body in a preloaded position. The preload mechanism can be adjusted to release a portion of the preload held by the body.

20 Claims, 7 Drawing Sheets

PRELOAD APPARATUS

RELATED APPLICATION

This application claims priority to U.S. Provisional Patent Application No. 62/753,810, filed on Oct. 31, 2018, and entitled "THREADED RING PRELOAD BEAMS", the entirety of which is incorporated herein by reference.

STATEMENT OF GOVERNMENTAL INTEREST

This invention was made with Government support under Contract No. DE-NA0003525 awarded by the United States Department of Energy/National Nuclear Security Administration. The U.S. Government has certain rights in the invention.

BACKGROUND

Conventionally, preloading components in a joint system involves mating the components and then torqueing one or more of the mated components to axially preload the overall joint system. The mated components are then secured in the preloaded position to maintain the function of the joint system. However, this conventional technique requires a higher external torque to be applied to the components because frictions between the adjacent surfaces resist the torqueing. This is exacerbated with large diameter joint systems. The higher external torque value requires the use of special tools and can damage components if not controlled. This technique is also sensitive to numerous factors (e.g., presence/absence of lubricant, roughness of the adjacent surface) that result in poor repeatability. Further, use of rotational movement to axially preload a component also results in non-uniform stress on the mated components, which degrades reliability of the mated components. In addition, the geometry and complexity of these conventional systems limit potential use cases.

SUMMARY

The following is a brief summary of subject matter that is described in greater detail herein. This summary is not intended to be limiting as to the scope of the claims.

In an exemplary embodiment, provided is an apparatus for providing a preload to mated pipes. The apparatus includes a ring-shaped body formed by a sidewall that optionally includes an aperture that extends through the sidewall. The apparatus further includes an attachment structure on a portion of the body. The attachment structure corresponds to an attachment portion of a pipe in the mated pipes to enable removably fastening of the body to the pipe. The apparatus further includes an adjustable preload mechanism. The preload mechanism can be removably attached to the body to hold the body in a preloaded position. The preload mechanism can then be adjusted to release a portion of the preload held by the body.

A method of preloading mated pipes includes generating a preload in a ring-shaped body by modifying a shape of aperture that extends through a sidewall of the body. The method further includes removably securing a portion of a preload mechanism to the body to hold the body in the preloaded position. The method yet further includes removably fastening the preloaded body to a pipe from amongst the mated pipes. The method also includes adjusting the preload mechanism to release a portion of the preload from the body to the mated pipes.

Further, in accordance with various aspects, provided is an apparatus for providing a preload to mated pipes. The apparatus includes a ring-shaped body formed by a sidewall that includes a plurality of apertures arranged around the body. Each aperture of the plurality of apertures extends through the sidewall. The apparatus further includes an attachment structure on a portion of the body. The attachment structure corresponds to an attachment portion of a pipe in the mated pipes to enable removably fastening of the body to the pipe. The apparatus further includes a plurality of preload mechanisms. Each aperture of the plurality of apertures has associated therewith a preload mechanism from the plurality of preload mechanisms. A preload mechanism from the plurality of preload mechanisms is removably attached to the body to hold a portion of the body in a preloaded position. Each preload mechanism from the plurality of preload mechanisms is adjustable to release a portion of the preload held by the body.

The above summary presents a simplified summary in order to provide a basic understanding of some aspects of the apparatus and/or methods discussed herein. This summary is not an extensive overview of the apparatus and/or methods discussed herein. It is not intended to identify key/critical elements or to delineate the scope of such apparatus and/or methods. Its sole purpose is to present some concepts in a simplified form as a prelude to the more detailed description that is presented later.

DETAILED DESCRIPTION

Figure 1:
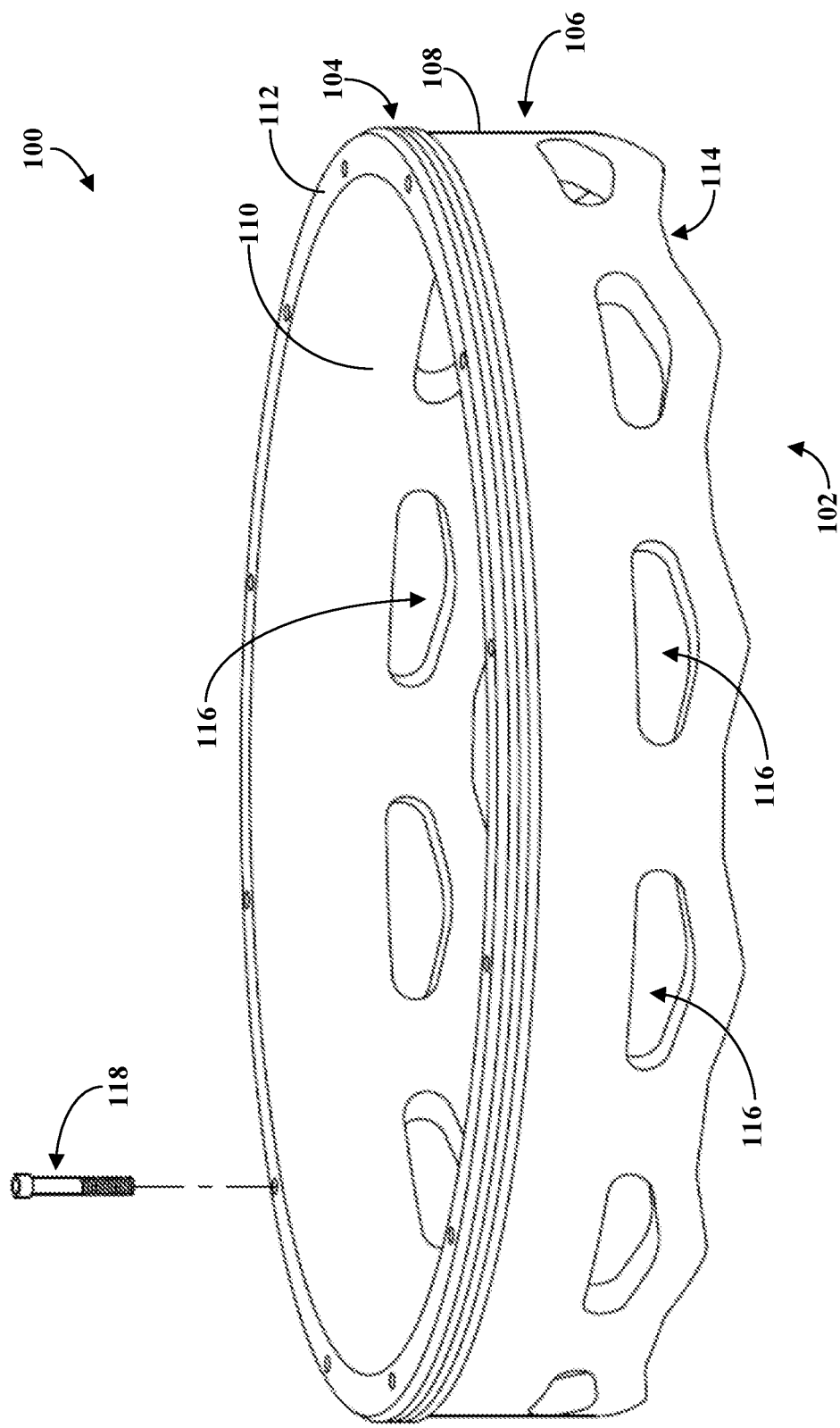
FIG. 1 illustrates an exemplary apparatus for providing a preload.

Various technologies pertaining to providing a preload to mated components are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details.

In reference to the disclosure herein, for purposes of convenience and clarity only, directional terms, such as, top, bottom, left, right, up, down, upper, lower, over, above, below, beneath, rear, and front, may be used. Such directional terms should not be construed to limit the scope of the features described herein in any manner. It is to be understood that embodiments presented herein are by way of example and not by way of limitation. The intent of the following detailed description, although discussing exemplary embodiments, is to be construed to cover all modifications, alternatives, and equivalents of the embodiments as may fall within the spirit and scope of the features described herein.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form. Additionally, as used herein, the term "exemplary" is intended to mean serving as an illustration or example of something and is not intended to indicate a preference.

Disclosed is an apparatus for providing a preload to mated cylindrical components. The disclosed apparatus includes a body with a sidewall that optionally includes one or more apertures that extend through the sidewall. The body can receive a set preload by modifying a shape of the aperture (e.g., compressing, stretching) and then using a preload mechanism to hold the body in the preload position. This preloaded apparatus can be attached to one or more of the mated cylindrical components and the preload mechanism can be adjusted to release a controlled amount of preload from the apparatus to the mated components. Because the amount of preload in the apparatus and the amount released by the apparatus to the mated components are each controlled, the apparatus provides more control for achieving a particular preload range in the mated components as compared to the conventional technique of providing a high torque to the mated components which can vary based on presence/absence of lubricant, roughness of adjacent surfaces in the mated components, and ability to provide the necessary high torque to achieve the preload.

Turning to FIG. 1, illustrated is one embodiment of an apparatus 100 for providing a preload to mated components. As illustrated in FIG. 1, the apparatus 100 includes a body 102 and an attachment structure 104 that can be used to attach the apparatus 100 to one or more of the mated components, as will be described in detail below. A prescribed preload can be applied to the body 102 and the body 102 can be held in this preloaded position via a preload mechanism(s). A select portion of this preload can then be released and applied to the mated components. By controlling the amount of preload held by the body 102 and/or the amount released by the body 102 into the mated components, the apparatus 100 allows for control of the preload applied and for similar preloads to be applied to assorted mated components.

The body 102 can be preloaded by applying a force(s) to one or more surfaces of the body 102. The body 102 can then be held or locked in this preloaded position using one or more preload mechanisms and the force may no longer need be applied. The force(s) can be applied along any suitable direction with respect to the body 102. For instance, a force can be applied coaxially to compress a portion of the body 102. In another embodiment, a force can be applied coaxially to pull or stretch a portion of the body 102. In yet another embodiment, a torqueing force can be applied to a portion of the body 102. The applied force(s) can cause the body 102 to stretch, compress, shear, bend, torque, and/or the like.

The force can be applied to the body 102 via any suitable source. For instance, in one embodiment, the force is applied by machinery or the like that is external to the apparatus 100 (e.g., a compression machine). In another example, the force is applied by the preload mechanism, as will be described in detail below with reference to at least FIGS. 2-3. In yet another example, the force can be applied by a combination of outside machinery and the preload mechanism.

In one embodiment, the force is used to elastically deform the body 102 such that when the force is removed, the body 102 returns to the unloaded state. In another embodiment, the force may result in a plastic or permanent deformation of the body 102 such that the body 102 remains in that state even after removal of the force. Any suitable amount of force can be applied to the body 102 and the amount may depend on material(s) used to form the body 102. For instance, a force applied to a first material can result in elastic deformation while the same force applied to a second material can result in plastic deformation.

The body 102 can be made of any suitable material. For instance, the body 102 can be made of an aluminum alloy, a steel alloy, a stainless-steel alloy, titanium, a metal, a metal alloy, plastic, composites, and/or the like. In one embodiment, the body 102 is formed of a single material. In another example, the body 102 is formed of a variety of materials.

The body 102 can comprise any suitable shape for providing a preload to the mated components. The shape of the body 102 may depend on the shape of a mated component and/or may be independent of the shape of the component. The mated components may be any suitable shape and each mated component may be similar and/or they may vary. In the illustrated embodiments, only two components are mated, however, any suitable number of components may be mated. In the following embodiments, the components are substantially cylindrical; however, the features described herein with respect to a cylindrical component can be associated with any suitable component shape. The cylindrical component can be solid, substantially solid, porous, hollow, filled, and/or any applicable structure. For instance, in one embodiment, the cylindrical component is a pipe capable of conveying a substance that can flow (e.g., gas, liquid, slurries, and/or the like). The cylindrical components can be mated in any suitable manner. For example, a cylindrical component can be nested within a hollow cylindrical component. In another example, two cylindrical components are mated end to end.

In one embodiment, illustrated in FIG. 1, similar to the cylindrical mated components, the body 102 can be generally cylindrical. In another example, the body 102 is a prism with an n-sided polygonal outer cross-section. In one example, an outer cross-section of the body 102 is uniform along the length of the body 102. In another example, the outer cross-section of the body 102 varies along the length. The body 102 can be solid, porous, hollow, filled, and/or any suitable structure. For instance, the body 102 can be hollow to permit a substance (e.g., gas, liquid, slurries, and/or the like) to pass through the body 102.

In the embodiment illustrated in FIG. 1, the body 102 has a ring-shaped cross-section. The ring-shaped body 102 includes a sidewall 106 with an outward facing surface 108, an inward facing surface 110, a top surface 112 extending from an edge of the outward surface 108 to an edge of the inward surface 110, and a bottom surface 114 that opposes the top surface 112 and that extends from another edge of the outward surface 108 to another edge of the inward surface 110. The top surface 112 and/or the bottom surface 114 can be planar as they extend around the body 102 and/or they can vary. For instance, in the illustrated embodiment, the top surface 112 is substantially planar while the bottom surface 114 oscillates between an upper portion and a lower portion.

In the illustrated embodiments, the sidewall 106 has a substantially uniform thickness along its length. However, it is conceivable that thickness of the sidewall 106 may vary along its length. For example, thickness of the sidewall 106 can be larger at the top surface 112 than at the bottom surface 114.

The body 102 can further include one or more apertures 116 that each extend through the sidewall 106. The aperture 116 is configured to change in shape as force is applied to the body 102, as will be described in detail below. For instance, an aperture 116 may stretch or compress from an initial unloaded shape to a preloaded shape as force is applied to the body 102. To this end, the aperture 116 may be situated at any suitable location around the body 102. For instance, in the illustrated embodiment, a plurality of apertures 116 are arranged symmetrically around the ring-shaped body 102. In the illustrated embodiment, the apertures 116 are arranged such that a bottom of each aperture 116 is adjacent a lower portion of the oscillating bottom surface 112. An amount an aperture 116 transforms in shape may correlate to an amount of preload held by the body 102 and by retaining the aperture 116 in this changed shape, the body 102 may be held in the preloaded position. For instance, an amount an aperture 116 is compressed can correlate to an amount of preload in the body 102.

Any suitable aperture shape may be used. In one example, the aperture 116 is substantially elliptical. In another example, the aperture 116 is circular. The aperture 116 may be triangular, rectangular, square, polygonal, and/or the like. Further, the aperture 116 may be uniform through the sidewall 106 and/or may change shape and/or size through the sidewall 106. For instance, the aperture 116 may be a first shape at the outward facing surface 108 and a second different shape at the inward facing surface 110. In another example, the aperture 116 may be telescoping as it passes through the sidewall 106, e.g. the aperture 116 may be a first size at the outward facing surface 108 and a second different size at the inward facing surface 110.

In the illustrated embodiment, the aperture 116 is filled with ambient air. However, it is conceivable that the aperture 116 can be filled with any suitable substance. For instance, the aperture 116 can contain solid filler material (e.g., silicone), a gas, a mixture of gases, and/or the like. The material contained in the aperture 116 may depend on the final setting of the apparatus 100. For instance, where the aperture 116 can be filled with material that substantially prevents a fluid from passing through the aperture 116.

The apparatus 100 further includes one or more preload mechanisms 118 that are configured to hold the body 102 in the preloaded position. The preload mechanism 118 can comprise any suitable structure and/or device for holding the body 102 in the preloaded position. In an exemplary embodiment, the preload mechanism 118 comprises a screw that passes through a center of an aperture 116 and is secured at opposing edges of the aperture 116 to hold the aperture 116 in the changed shape and by extension hold the body 102 in the preloaded position. The apparatus 100 can include any suitable number of preload mechanisms 118 and the number of preload mechanisms 118 may depend on the number of apertures 116 that are to be held in a preloaded position. In one embodiment, the number of preload mechanisms 118 and the number of apertures 116 are similar. In another embodiment, the apparatus 100 includes more preload mechanisms 118 and/or more apertures 116. For instance, instead of a singular preload mechanism 118 passing through the center of the aperture 116, two or more preload mechanisms 118 may be passed through the aperture 116 and secured at opposing edges of the aperture 116.

The preload mechanism 118 can be attached to the body 102 via any suitable method. For instance, the body 102 can include one or more openings in a surface of the sidewall 106 that permit the preload mechanism 118 to pass through the aperture 116 from a first edge of the aperture 116 to an opposing second edge of the aperture 116. In the embodiment illustrated in FIG. 1, this type of opening is located on the top surface 112 of the body 102. Similar to the arranged apertures 116 in the illustrated embodiment, the body 102 includes a plurality of openings arranged on the top surface 112, where each opening corresponds to an aperture 116. In another example, the preload mechanism 118 can be placed within the aperture 116 and then secured at opposing edges of the aperture 116.

In one embodiment, the preload mechanism 118 can be removably attached to the body 102. In another embodiment, the preload mechanism 118 can be permanently attached to the body 102.

In order to control the amount of preload released by the body 102 and/or preload held by the body 102, the preload mechanism 118 may be configured to control the transition of the body 102 from a preloaded position to an unloaded position and/or vice-versa. More particularly, the preload mechanism 118 may be adjustable to hold an aperture 116 at different shapes along a spectrum from a preloaded shape to a non-loaded shape. For example, where an aperture 116 is compressed in the preloaded position, the preload mechanism 118 can be adjustable to hold the aperture 116 at different expansions as the preload is released by the body 102.

The preload selectively released from the body 102 can be applied to one or more of the mated components. To this end, the apparatus 100 includes attachment structure 104 that can be employed to attach the apparatus 100 to one or more of the mated components. One or more of the mated components can include an attachment portion that corresponds to the attachment structure 104 permitting attachment of the apparatus 100 to the one or more mated components. In one embodiment, the apparatus 100 can be releasably attached to one or more of the mated components. In another embodiment, the apparatus 100 can be permanently attached to one or more of the mated components.

The attachment structure 104 may be formed integrally with the body 102 (e.g., formed on a surface of the body 102) and/or may be formed separately from the body 102 and attached thereto. The attachment structure 104 can take any suitable shape for attaching the body 102 to one or more of the mated components. For instance, in the illustrated embodiment, the attachment structure 104 comprises a screw thread that extends along a surface of the body 102. This screw thread may be formed on the outward facing surface 108 (as illustrated) and/or may be formed on any other suitable surface of the body 102 (e.g., the inward facing surface 110). The illustrated screw thread may have any suitable thread profile and the profile may depend on the material used to form the attachment structure 104 and/or an amount of preload being applied by the apparatus 100 to the mated components. For example, the thread profile can be buttress and/or acme. In another embodiment, the attachment structure 104 comprises one or more cam structures that are inserted into and interact with corresponding cam structure in one or more the mated components.

The attachment structure 104 can be formed of any suitable material. In one embodiment, the body 102 and the attachment structure 104 are made of the same material. In another embodiment, the body 102 and the attachment structure 104 are made of different material. For example, the attachment structure 104 can be made of an aluminum alloy, a steel alloy, a stainless-steel alloy, titanium, a metal, a metal alloy, plastic, composites, and/or the like. In one embodiment, the attachment structure 104 is formed of a single material. In another example, the attachment structure 104 is formed of a variety of materials.

Figure 2:
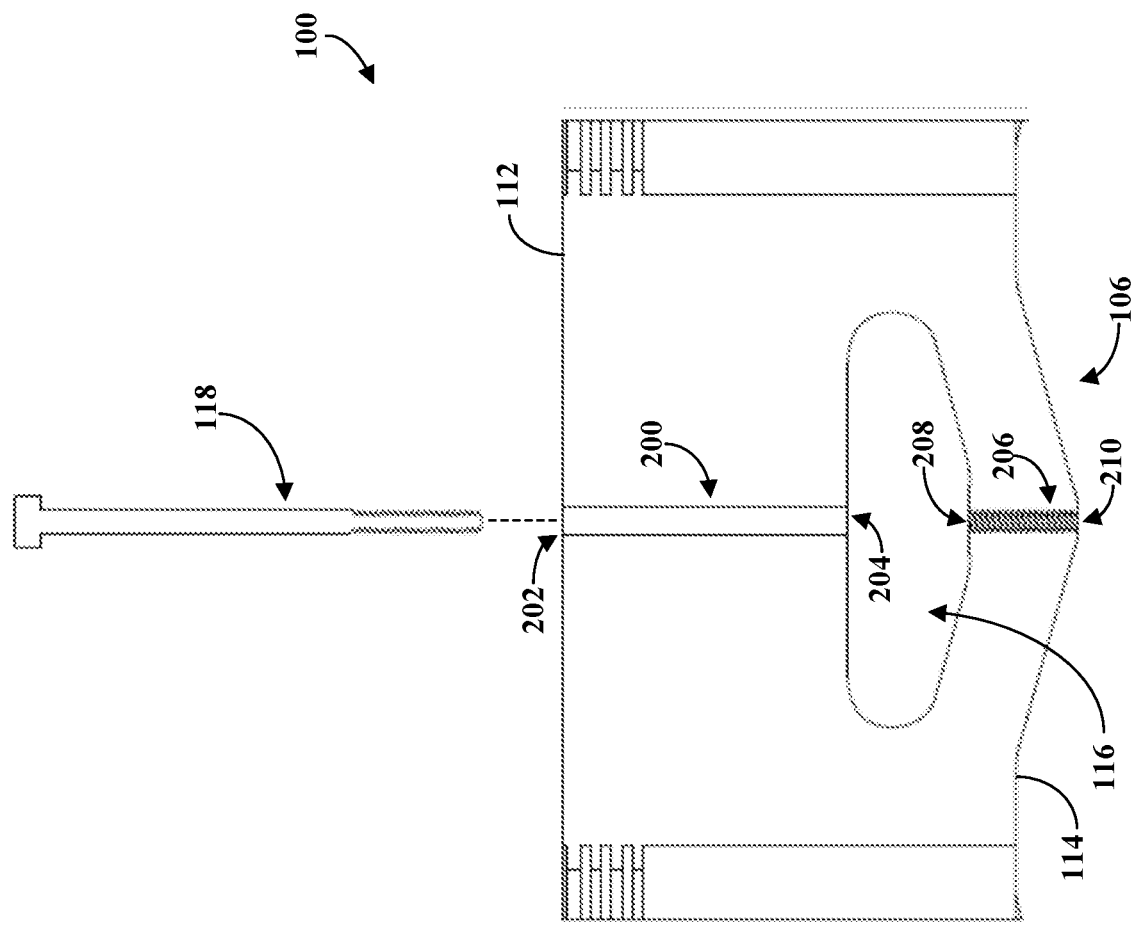
FIG. 2 illustrates a profile view of an unloaded apparatus.
Figure 3:
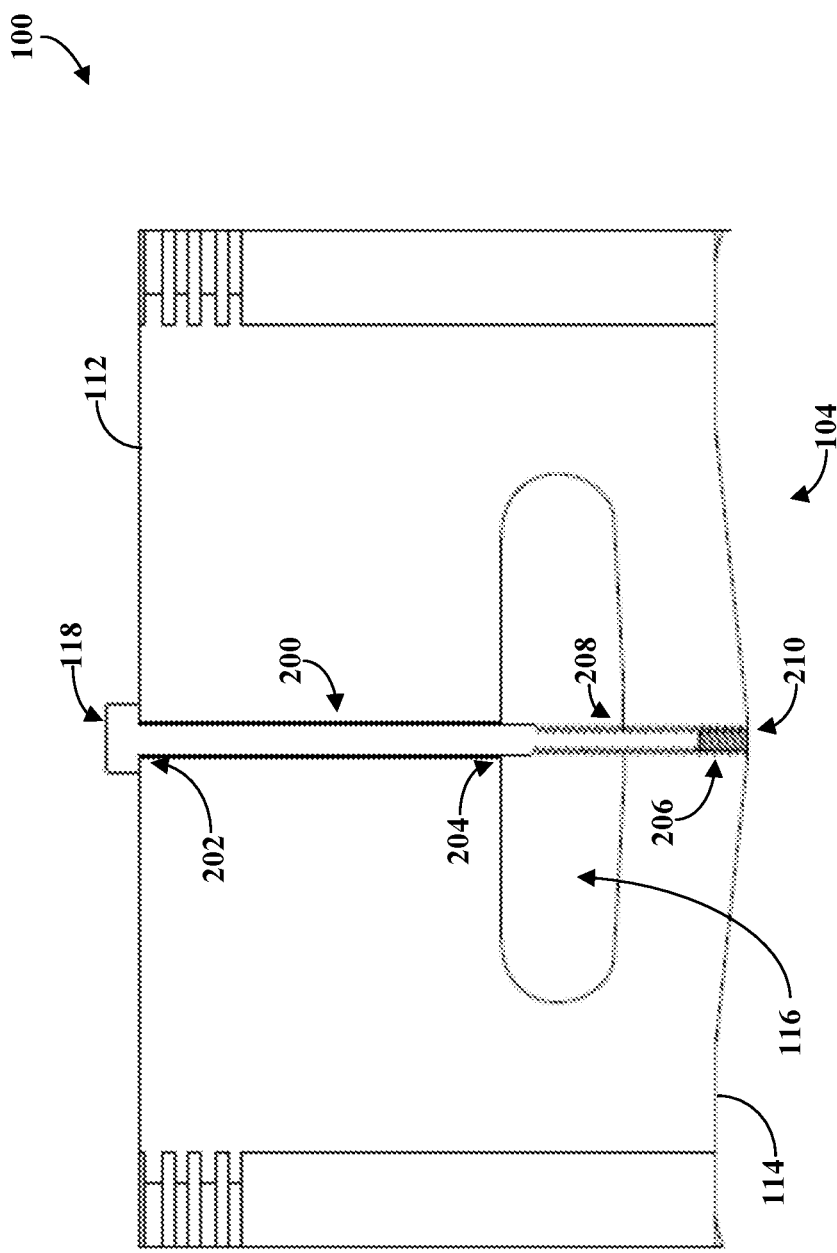
FIG. 3 illustrates a profile view of a preloaded apparatus.

Turning now to FIGS. 2 and 3, illustrated is an embodiment of an aperture 116 in an unloaded state (FIG. 2) and a preloaded state (FIG. 3). In the illustrated embodiment, axial force is applied to the body 102 which causes the aperture 116 to compress as a portion of the bottom surface 114 and a portion of the top surface 112 move towards each other. The preload mechanism 118 can then be employed to hold the aperture 116 in this compressed or preloaded position, as illustrated in FIG. 3.

Turning to FIG. 2, illustrated is profile view of an aperture 116 that extends through the sidewall 106 of the apparatus 100. The sidewall 106 further includes passageway 200 that extends from an opening 202 at the top surface 112 of the sidewall 106 to an opening 204 at a first edge of the aperture 116. The passageway 200 can be used to pass a preload mechanism 118 from a surface of the sidewall 106 (e.g., the top surface 112) to the aperture 116. In the illustrated embodiment, the passageway 200 is generally cylindrical; however, the passageway 200 can take any suitable shape and the shape may depend on a shape of the preload mechanism 118.

In the illustrated embodiment, the sidewall 106 further includes a second passageway 206. The second passageway 206 extends downwardly from an opening 208 at a second edge of the aperture 116 for a portion of the distance between the second edge of the aperture 116 and the bottom surface 114. In one embodiment, shown in FIGS. 2-3, the second passageway 206 extends the entire distance from the second edge of the aperture 116 to the bottom surface 114, terminating at an opening 210 on the bottom surface 114. In another embodiment, the second passageway 206 extends for less than the entire distance.

The passageway 200 and/or the second passageway 206 can include appropriate structure that allow the preload mechanism 116 to hold the aperture 116 in the preloaded position (e.g., the compressed position) and to control release of the preload held by the body 102. The structure may depend on the type of preload mechanism 118 employed. For example, in the illustrated embodiment, the preload mechanism 118 includes a head and a shaft with screw threads along a portion of the shaft, where the shaft extends perpendicularly from the head. The second passageway 206 can include corresponding screw threads that engage the screw threads of the preload mechanism 116 to removably join the preload mechanism 118 to the second passageway 206.

As illustrated in FIG. 3, by securing the preload mechanism 118 at opposing sides of the apertures 116, the preload mechanism 118 can prevent release of the preload held by the body 102. More particularly, the preload mechanism 118 can be made of material that has a stiffness property higher than the preload held by the body 102, such that the preload mechanism 118 does not stretch when holding the preload. In one embodiment, illustrated in FIG. 3, the preload mechanism 118 is secured on one side of the aperture 116 by engaging the screw threads on the preload mechanism 118 to the screw threads in the second passageway 206 and on second side of the aperture 116 by the head engaging the top surface 112.

The preload held in the body 102 can then be selectively released by unscrewing the screw threads on the preload mechanism 118 from the screw threads in the second passageway 206. This can cause the aperture 116 to expand and the bottom surface 114 to move downward. Any selected portion of the preload can be released via this technique. In one example, a majority of the preload held by the body 102 can be released, for instance by removing the preload mechanism 118.

As briefly mentioned above, in certain embodiments in addition to holding the preload in the body 102, the preload mechanism 118 can be used to generate the preload in the body 102. With reference to the preload mechanism 118 illustrated in FIGS. 2-3, the preload mechanism 118 can be inserted through the passageway 200 and a screw thread on the preload mechanism 118 can engage the screw thread in the second passageway 206. The preload mechanism 118 can then be threaded onto the screw thread in the second passageway 206 causing the aperture 116 to compress and the bottom surface 114 to move upward. Therefore, the preload mechanism 118 may be selectively threaded onto and threaded off of the screw threads in the second passageway 206 to selectively generate and release a preload in the body 102.

Figure 4:
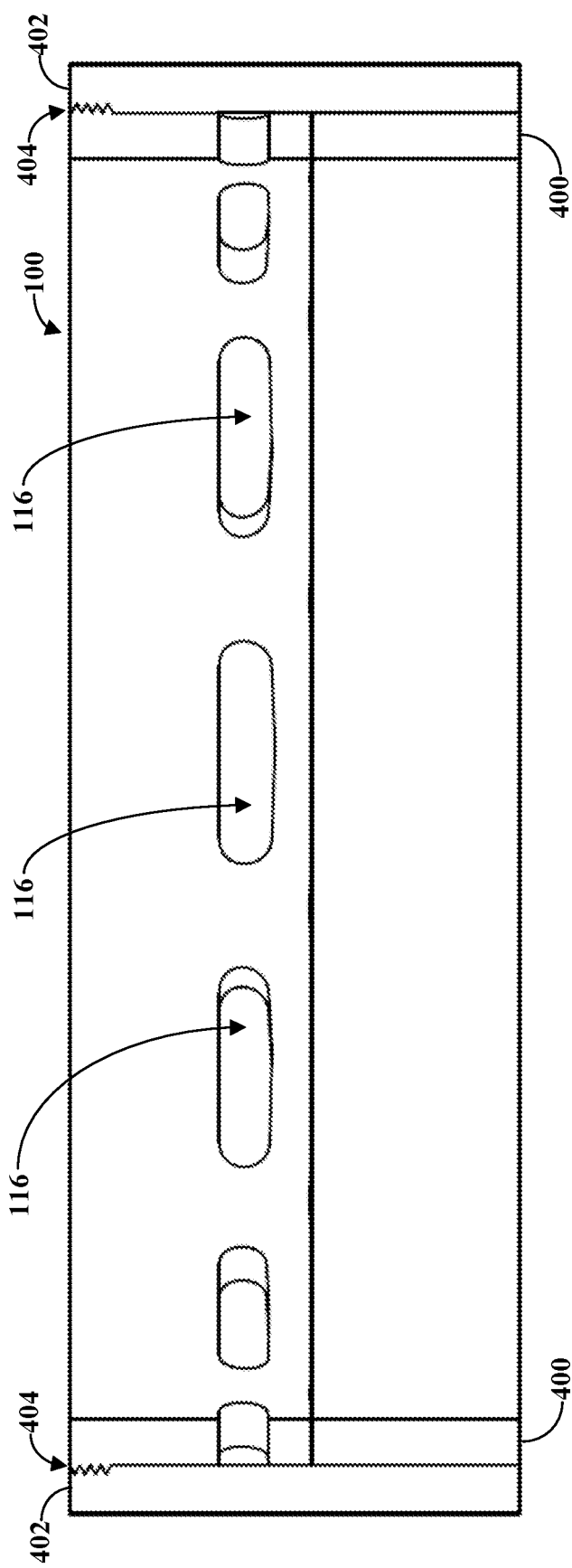
FIG. 4 illustrates another exemplary apparatus for providing a preload.

Turning now to FIG. 4, illustrated is an embodiment of an apparatus 100 providing a preload to nested cylinders. More particularly, a first pipe 400 is nested within a second pipe 402. Conventionally, in order to preload the nested first pipe 400, an external torque would be applied to the first pipe 400 which may be difficult to apply based on the geometries of the nested pipes 400 and 402. Further, in order to maintain the first pipe 400 in the preloaded position, an external piece must be attached to the second pipe 402 to prevent the first pipe 400 from releasing the preload, while holding the first pipe 400 in the preloaded position.

In contrast, the apparatus 100 can be attached to the second pipe 402 and a selective preload from the apparatus 100 can be applied to the first pipe 400. By attaching the apparatus 100 to the second pipe 402, the controlled amount of preload can be continuously applied to the first pipe 400. In the illustrated embodiment, in order to transmit the preload from the apparatus 100 to the first pipe 400, a portion of the bottom surface 114 of the apparatus 100 engages and presses on an upper surface of the first pipe 400. Additionally, as illustrated, the body 102 can be dimensioned such that a thickness of the body 102 and a thickness of the first pipe 400 are similar such that a preload released by the body 102 can be evenly applied to the first pipe 400. In the illustrated embodiment, all of the preload mechanisms for each of the illustrated apertures 116 have been removed. However, it is contemplated that any number of preload mechanisms may be retained in the body 102.

In the embodiment illustrated in FIG. 4, the attachment structure of the apparatus 100 comprises a screw thread 404 that extends outwardly from an outward facing surface of the sidewall of the apparatus 100. The corresponding attachment portion on the second pipe 402 can comprise a screw thread indented on an internal surface of the second pipe 402. In another embodiment, the illustrated screw thread interaction can be reversed, i.e. the screw thread on the apparatus 100 can be indented while the screw thread on the second pipe 402 extends outwardly.

Figure 5:
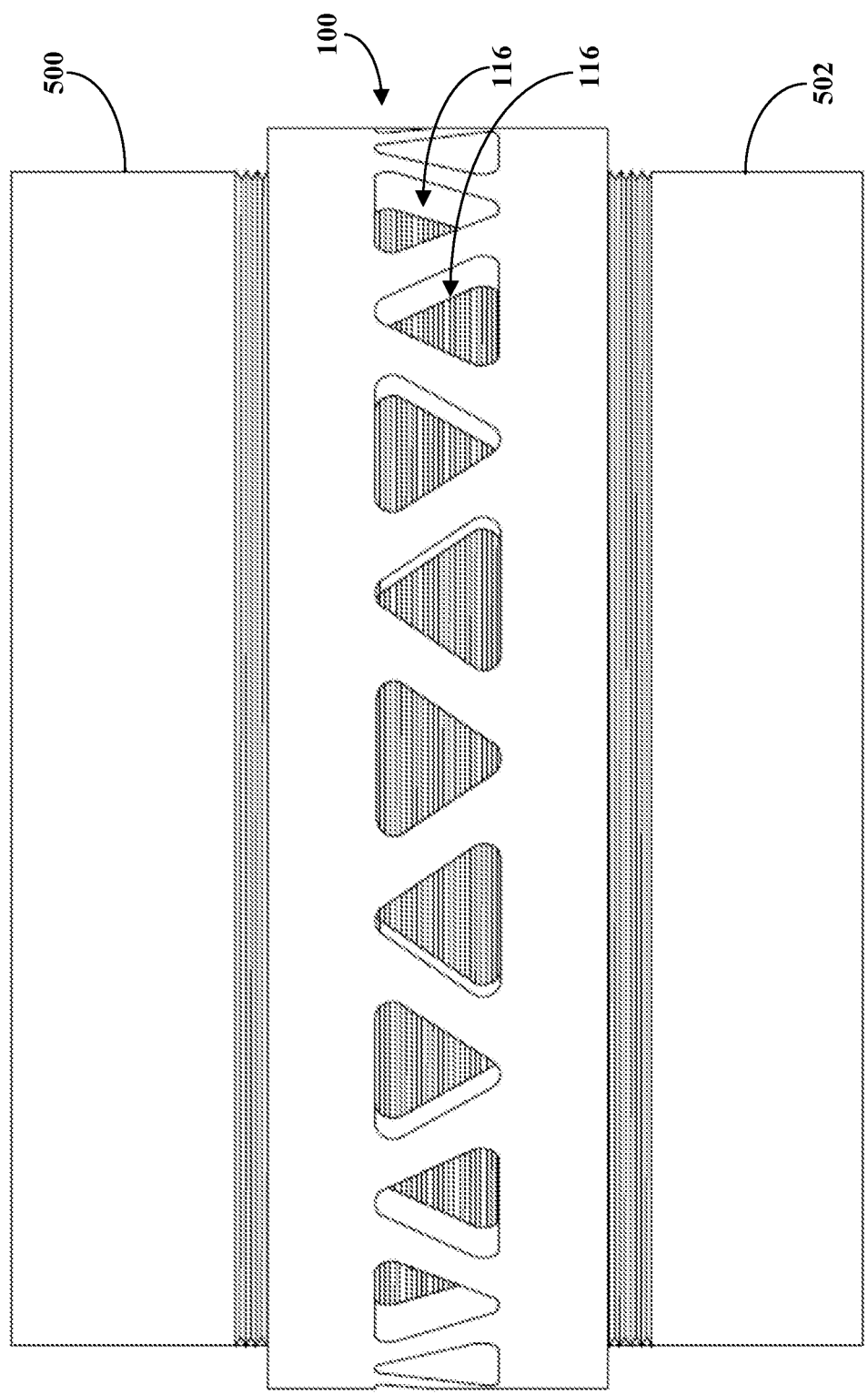
FIG. 5 illustrates a further exemplary apparatus for providing a preload.
Figure 6:
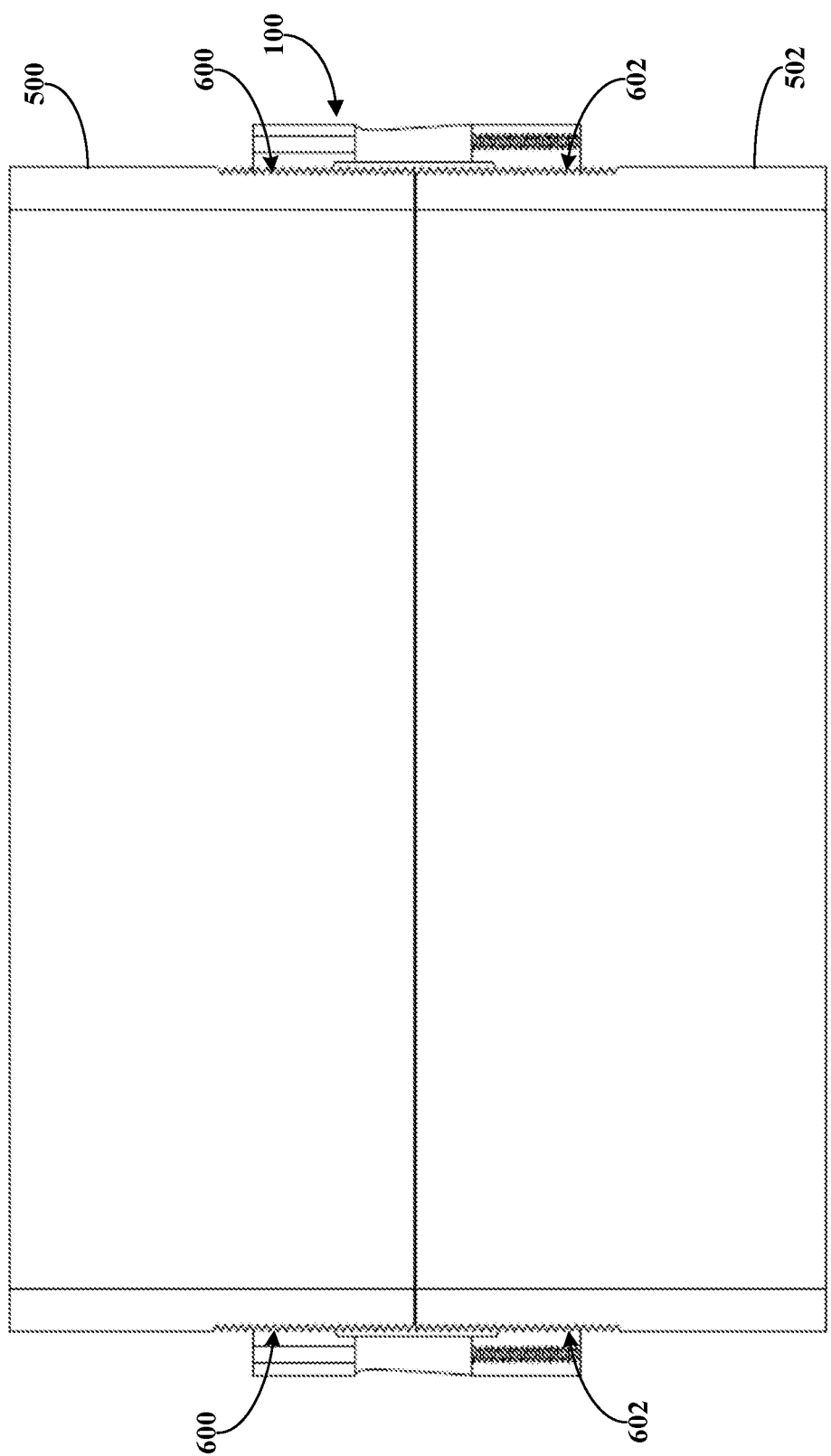
FIG. 6 illustrates a yet further exemplary apparatus for providing a preload.

Turning now to FIGS. 5-6, illustrated is an embodiment of the apparatus 100 that provides a preload to end to end mated components. In the illustrated embodiment, the mated components comprise a first pipe 500 and a second pipe 502 that are mated end to end. The apparatus 100 can be removably attached to the first pipe 500 and/or the second pipe 502 to provide a preload to the first pipe 500 and/or the second pipe 502. In this embodiment, an aperture 116 in the apparatus 100 may be stretched in the preloaded position and as the preload is released by the apparatus 100, the apparatus 100 compresses the mated ends of the first pipe 500 and the second pipe 502 together. In the illustrated embodiment, each aperture 116 is substantially triangular and orientation of the triangle alternates around the body 102.

Turning to FIG. 6, illustrated is the attachment structure of the apparatus 100 illustrated in FIG. 5. The illustrated attachment structure comprises a first screw thread 600 that engages a corresponding screw thread on the first pipe 500 and a second screw thread 602 that engages a corresponding screw thread on the second pipe 502. However, any suitable attachment structure may be employed for attaching the apparatus 100 to the first pipe 500 and/or the second pipe 502. Further, any suitable thread profile may be used for the first screw thread 600, the second screw thread 602, the screw thread on the first pipe 500, and/or the screw thread on the second pipe 502. In one embodiment, the thread profile is the same for the first screw thread 600 and the second screw thread 602. In another embodiment, the thread profile of the first screw thread 600 and the second screw thread 602 are different.

Figure 7:
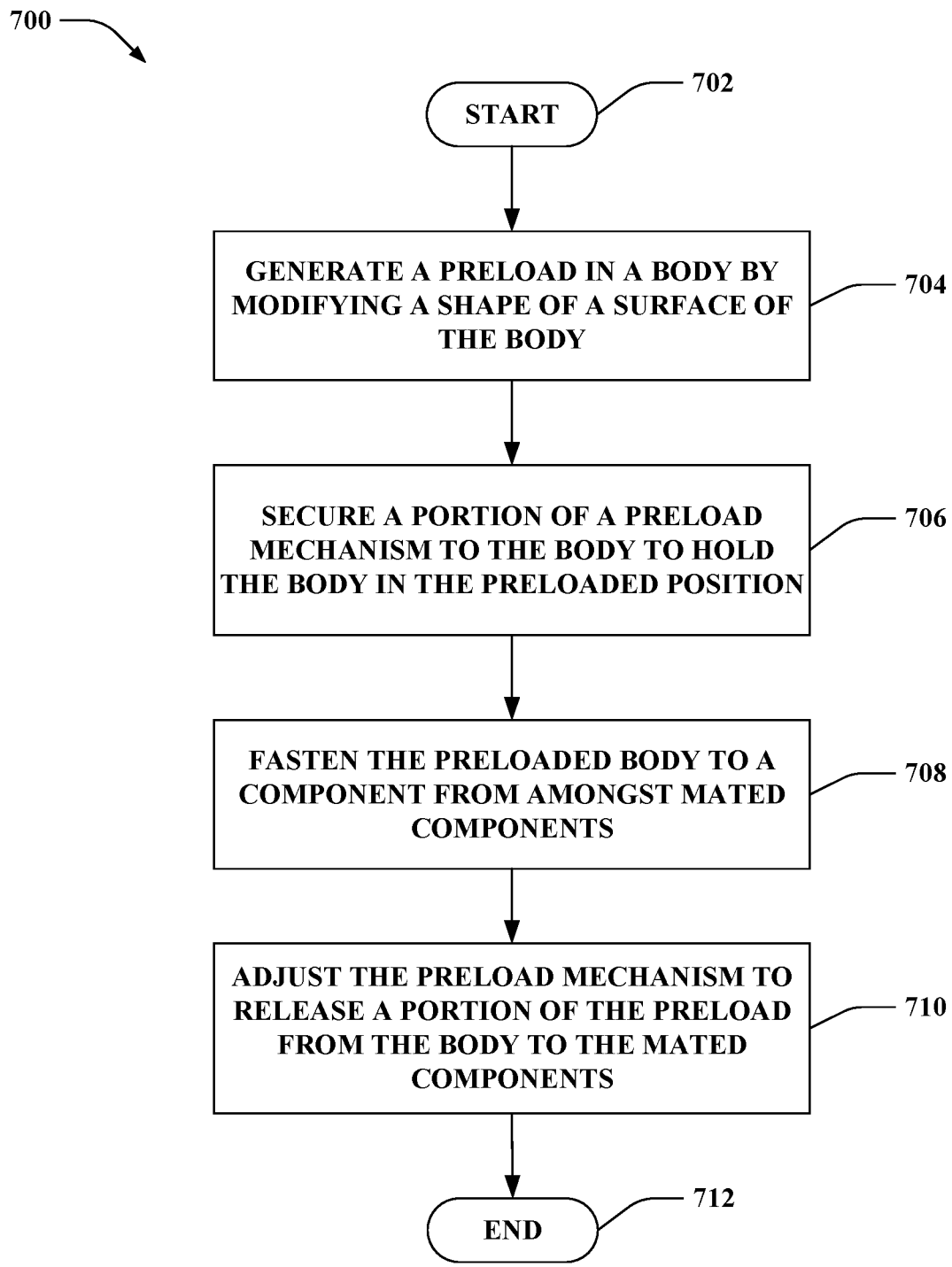
FIG. 7 is a flow diagram that illustrates an exemplary methodology for preloading mated pipes.

FIG. 7 illustrates an exemplary methodology relating to preloading mated pipes. While the methodology is shown as being a series of acts that are performed in a sequence, it is to be understood and appreciated that the methodology is not limited by the order of the sequence. For example, some acts can occur in a different order than what is described herein. In addition, an act can occur concurrently with another act. Further, in some instances, not all acts may be required to implement a methodology described herein.

Referring now to FIG. 7, an exemplary methodology 700 for preloading mated components is illustrated. The methodology 700 starts at 702, and at 704, a preload is generated in a body by modifying a shape of a surface of the body. At 706, a portion of a preload mechanism is secured to the body to hold the body in the preloaded position. At 708, the preloaded body is removably fastened to a component from amongst the mated components. At 710, the preload mechanism is adjusted to release a portion of the preload from the body to the mated components. The methodology 700 concludes at 712.

In an embodiment of the methodology 700, the step of generating the preload in the ring-shaped body comprises compressing a portion of the body. In a version of this embodiment of the methodology 700, the step of removably securing the preload mechanism comprises passing a screw through an aperture in a sidewall of the body from a first edge of the aperture to a second edge of the aperture and threading the screw into a corresponding screw threaded hole at the second edge to secure the screw at the second edge.

In another embodiment of the methodology 700, the step of fastening the preloaded body to the component comprises threading a screw thread on a surface of the body onto a corresponding attachment structure on the component.

In a further embodiment of the methodology 700, the step of generating the preload in the body comprises holding a portion of the body in tension.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. An apparatus for providing a preload to mated components comprising:
   a body configured to generate and store a preload, wherein the body includes a sidewall and an aperture that extends through the sidewall;
   an attachment structure on a portion of the body, wherein the attachment structure corresponds to an attachment portion of a component in the mated components, wherein the attachment structure enables fastening of the body to the component; and
   an adjustable preload mechanism, wherein the preload mechanism is attachable to the body to hold the body in a preloaded position, wherein the preload mechanism is adjustable to release a portion of the preload held by the body,
   wherein the aperture is defined by a first edge and a second edge, wherein the preload mechanism comprises a screw that extends through the aperture from the first edge to the second edge, wherein the screw is removably secured to at least one of the first edge or the second edge of the aperture.

2. The apparatus of claim 1, wherein the attachment structure comprises a screw thread formed on at least one surface of the body.

3. The apparatus of claim 2, wherein the screw thread comprises at least one of buttress screw thread or acme screw thread.

4. The apparatus of claim 1, further comprising a plurality of apertures that each extend through the sidewall, wherein the plurality of apertures are arranged around the body.

5. The apparatus of claim 4, further comprising a plurality of adjustable preload mechanisms, wherein the plurality of preload mechanisms includes the preload mechanism, wherein each aperture of the plurality of apertures has associated therewith a preload mechanism from the plurality of preload mechanisms.

6. The apparatus of claim 1, wherein the aperture contains at least one of a solid filler material, a gas, a mixture of gases, a liquid, or ambient air.

7. The apparatus of claim 1, wherein a second portion of the body is compressed when the body is in the preloaded position.

8. The apparatus of claim 1, wherein a second portion of the body is held in tension when the body is in the preloaded position.

9. The apparatus of claim 1, wherein the body is formed of a material comprising at least one of aluminum alloy, steel alloy, stainless steel alloy, titanium, plastic, or composite.

10. The apparatus of claim 1, wherein the body is formed of a first material, wherein the attachment structure is formed of a second material different from the first material.

11. An apparatus for providing a preload to mated components comprising:
    a ring-shaped body formed by a sidewall, wherein the ring-shaped body includes an aperture that extends through the sidewall;

an attachment structure on a portion of the body, wherein the attachment structure corresponds to an attachment portion of a component in the mated components, wherein the attachment structure enables removable fastening of the body to the component; and an adjustable preload mechanism, wherein the preload mechanism is removably attached to the body to hold the body in a preloaded position, wherein a portion of the aperture is compressed when the body is in the preloaded position, wherein the preload mechanism is adjustable to release a portion of the preload held by the body.

12. The apparatus of claim 11, wherein the attachment structure comprises a screw thread formed on at least one surface of the body.

13. The apparatus of claim 11, wherein the body further comprises a plurality of apertures that each extend through the sidewall, wherein the plurality of apertures are arranged around the body.

14. The apparatus of claim 13, further comprising a plurality of adjustable preload mechanisms, wherein the plurality of preload mechanisms includes the preload mechanism, wherein each aperture of the plurality of aperture has associated therewith a preload mechanism from the plurality of preload mechanisms.

15. The apparatus of claim 11, wherein the aperture is defined by a first edge and a second edge, wherein the preload mechanism comprises a screw that extends through the aperture from the first edge to the second edge, wherein the screw is removably secured to at least one of the first edge or the second edge of the aperture.

16. The apparatus of claim 11, wherein the aperture contains at least one of a solid filler material, a gas, a mixture of gases, a liquid, or ambient air.

17. An apparatus for providing a preload to mated components comprising:

a ring-shaped body formed by a sidewall, wherein the ring-shaped body includes an aperture that extends through the sidewall;

an attachment structure on a portion of the body, wherein the attachment structure corresponds to an attachment portion of a component in the mated components, wherein the attachment structure enables removable fastening of the body to the component; and an adjustable preload mechanism, wherein the preload mechanism is removably attached to the body to hold the body in a preloaded position, wherein a portion of the aperture is held in tension when the body is in the preloaded position, wherein the preload mechanism is adjustable to release a portion of the preload held by the body.

18. The apparatus of claim 17, wherein the aperture contains at least one of a solid filler material, a gas, a mixture of gases, a liquid, or ambient air.

19. The apparatus of claim 17, wherein the attachment structure comprises a screw thread formed on at least one surface of the body.

20. The apparatus of claim 19, further comprising a second attachment structure on a second portion of the body, wherein the second attachment structure corresponds to the other component of the mated components, wherein the second attachment structure enables removable fastening of the body to the other component, wherein the second attachment structure comprises a second screw thread formed on the at least one surface of the body.

* * * * *